United States Patent [19]

Somer

[11] Patent Number: 5,740,174
[45] Date of Patent: Apr. 14, 1998

[54] METHOD AND APPARATUS FOR PERFORMING COLLISION DETECTION AND ARBITRATION WITHIN AN EXPANSION BUS HAVING MULTIPLE TRANSMISSION REPEATER UNITS

[75] Inventor: Gregory B. Somer, Mountain View, Calif.

[73] Assignee: Cypress Semiconductor Corp., San Jose, Calif.

[21] Appl. No.: 552,272

[22] Filed: Nov. 2, 1995

[51] Int. Cl.$^6$ .................................................. H04L 12/413
[52] U.S. Cl. .......................... 370/402; 370/438; 370/448
[58] Field of Search .................................. 370/364, 402,
370/401, 438, 445, 447, 448, 439, 440,
403, 404, 405; 395/200.02, 200.1

[56] References Cited

U.S. PATENT DOCUMENTS 5,311,512 5/1994 Bartis et al. ............................ 370/85.2
5,345,447 9/1994 Noel ........................................ 370/67

*Primary Examiner*—Douglas W. Olms
*Assistant Examiner*—Matthew C. Phillips
*Attorney, Agent, or Firm*—Blakely, Sokoloff, Taylor & Zafman LLP

[57] ABSTRACT

An expansion bus is provided for use with bus systems of the type wherein only a single data signal or data packet may be transmitted over the bus at any one time, such as Ethernet bus systems. The expansion bus includes a set of repeater units each connected to a set of local transceivers respectively connected to remote bus masters, such as remote computers. The repeater units are interconnected by a single data bus. Collision detection and arbitration of usage of the single data line is achieved using a distributed symmetric arbitration system as follows. Each repeater unit has a dedicated activity line which is interconnected to each of the other repeater units. Each repeater unit also includes an identical arbitration unit connected to the respective activity lines. When a repeater unit receives data from a local transceiver for transmission onto the single data bus, the arbitration unit of the repeater unit asserts an activity signal onto the corresponding activity line. The arbitration unit then waits a predetermined time period before enabling transmission of data onto the single data bus. If, during that time period, any activity signals are detected on any of the other activity lines, then data transmission is not enabled. Rather, a global collision is detected and appropriate jam signals are transmitted to the remote computers providing the data indicating that the data is invalid and must be retransmitted. The predetermined delay period is at least equal to the maximum amount of time required for an activity signal to be transmitted to, and processed by, each of the other repeater units of the system. The arbitration units continue to monitor for activity signals throughout the duration of a data transmission and if any such activity signals are asserted, the data transmission is invalidated and may be terminated. Again, appropriate jam signals are transmitted to the remote computers. Method and apparatus embodiments of the invention are disclosed.

12 Claims, 6 Drawing Sheets

METHOD AND APPARATUS FOR PERFORMING COLLISION DETECTION AND ARBITRATION WITHIN AN EXPANSION BUS HAVING MULTIPLE TRANSMISSION REPEATER UNITS

BACKGROUND OF THE INVENTION

1. Field of the Invention

The invention generally relates to bus systems and in particular to an expansion bus for use within a bus system of the type wherein only one signal or signal packet may be transmitted at any one time, such as a bus system configured in accordance with Ethernet bus protocol standards.

2. Description of Related Art

A variety of bus systems have been developed for use with computer systems, communications equipment, I/O systems and the like, wherein any one of a variety of bus masters (also called data terminal equipment units or DTEs) are capable of transmitting signals over a single data transmission bus. Within such bus systems, if two or more bus masters attempt to transmit data over the single data bus at one time a "collision" condition occurs and the data provided by both bus masters is invalidated and subsequently retransmitted. Accordingly, method and apparatus have been developed for detecting collision conditions among data signals transmitted simultaneously by two or more bus masters. One such bus system is an Ethernet bus configured in accordance with Ethernet protocols specified by the IEEE.

In one implementation, each of a plurality of bus masters are connected through respective local transceivers to a single repeater unit which retransmits or "repeats" data signals received from one of the bus masters onto transmission lines to all of the other bus masters. Logic is provided within the repeater unit for detecting whether data signals are received simultaneously from two or more bus masters through their respective local transceivers. If so, a local collision condition is detected and a "jam" signal is transmitted to each of the bus masters indicating that the data signals are to be invalidated and retransmitted.

Typically, within such bus systems, the repeater unit can only accommodate relatively few local transceivers and hence the bus system can accommodate only relatively few bus masters. Expansion systems have been developed which allow two or more repeater units to be interconnected thereby allowing a greater number of local transceivers to be employed and a greater number of bus masters to be accommodated. The expansion bus allows signals received through a local transceiver connected to one of the repeater units to be output through a local transceiver connected to either the same repeater unit or a different repeater unit. Local collision detection logic, of the type described above, is employed within each repeater unit to detect collisions between data signals received through the local transceivers connected to that repeater unit. However, "global" collisions between data signals received through local transceivers connected to separate repeater units must also be detected. Although several techniques for such global collision detection have been proposed and implemented, none have yet been completely satisfactory.

In one proposed implementation, an external arbitration unit is provided which is connected to each of the repeater units. Dedicated request lines and acknowledge lines interconnect each repeater unit to the central arbitration unit. When a repeater unit detects that a local transceiver connected thereto has data to be transmitted, the repeater unit transmits a request signal to the arbitration unit. The arbitration unit monitors all request lines and, if only one request signal is received, the arbitration unit grants access to the extension bus to that single requesting repeater unit by providing an appropriate signal along the acknowledge line. If two or more request signals are received simultaneously, or if a second request signal is received while a first repeater unit is transmitting data, the central arbitration unit transmits appropriate signals over the acknowledgment lines identifying a collision. The various repeater units then transmit jam signals to the respective bus masters connected thereto causing invalidation of any data currently being transmitted by the bus masters.

One disadvantage of the aforementioned global collision detection method is that it requires the presence of the external arbitration unit, thereby requiring additional circuit components beyond those comprising the repeater units. Also, lengthy delays may occur as a result of the need to transmit signals to and from the central arbitration unit and further delays may be caused by the execution of the logic within the central arbitration unit.

A second proposed system employs a single activity line interconnecting each of the repeater units. Upon detection of data to be transmitted, a repeater unit transmits a unique ID vector signal onto the activity line to each of the other repeater units. Each repeater unit continuously monitors the activity line to determine whether an activity signal has been asserted by one of the other repeater units. The unique ID vector signal is employed to allow each repeater unit to distinguish activity signals generated by other repeater units from its own activity signal. A comparator, provided within each repeater unit, is employed to check all ID vectors detected on the activity line bus against the ID vector assigned to that repeater unit. If the ID vector on the bus does not match the ID vector assigned to the repeater unit, then a collision is detected and appropriate jam signals are transmitted to the various bus masters. Although this latter system has the advantage that no central arbitration unit is required and only a single activity line is required, additional logic is required to generate and detect to the ID vectors. Also, depending upon the implementation, the repeater unit having the lowest ID vector may not be able to detect the collision. This occurs if the lowest ID vector, once transmitted onto the single activity line, completely masks any or all ID vectors provided by the other repeater units. Hence, the repeater unit having the lowest ID must wait for a collision indication to be provided by another one of the repeater units. This increases the overall collision detection time for the repeater unit having the lowest ID vector. In other words, the collision detection technique is not symmetric and additional logic and additional delays may arise as a result of the asymmetry.

In view of the disadvantages of the aforementioned techniques, it would desirable to provide an improved method and apparatus for detecting global collisions and arbitrating bus usage within an expansion bus interconnecting two or more repeater units, particularly, for use with bus systems wherein only a single signal may be transmitted at any one time, such as an Ethernet bus system. It is to this end that aspects of the present invention are primarily drawn.

SUMMARY OF THE INVENTION

In accordance with the invention, an expansion bus is provided which includes a plurality of repeater units each connected to a separate plurality of local transceiver units, each in turn connected to a remote bus master. A single expansion data bus interconnects the repeater units. A separate activity line is provided for each repeater unit. Each separate activity line interconnects all of the repeater units thereby allowing each repeater unit to transmit activity signals to all other repeater units along a separate dedicated line. Each repeater unit also includes an arbitration unit for use in determining whether the respective repeater unit may transmit data over the single expansion bus interconnecting the repeater units and for detecting global collisions.

In accordance with one implementation of the invention, arbitration is achieved by first detecting whether data signals are received through one of the local transceivers for retransmission onto the single expansion bus. If so, an activity signal is asserted onto the activity line corresponding to the repeater unit detecting the data signals to be transmitted. Transmission of the data signals on the expansion bus is delayed for a predetermined period of delay time. The delay time is set to, for example, the maximum amount of time necessary for the activity signal to be transmitted to, and processed by, each of the other repeater units. During the delay time, all other activity lines are monitored to determine whether any of the other repeater units have asserted activity signals. If no such signals are asserted during the delay time, then data transmission across the expansion bus begins. If at least one other activity signal is asserted during the delay time, then a collision condition is detected and appropriate jam signals are transmitted by the repeater units to the remote bus masters indicating that the data to be transmitted is invalid and must be retransmitted. A global collision condition is also detected if, after data transmission has already began by one of the repeater units, another repeater unit detects data to be transmitted and asserts its dedicated activity line. Again, appropriate jam signals are transmitted to the external bus masters indicating invalidation of the data.

Thus, arbitration and global collision detection is achieved without requiring a separate central arbitration unit. Rather, an arbitration unit is provided within each of the repeater units. Moreover, the arbitration units are symmetric, i.e., each is identical and no separate accommodation is required for special cases such as in expansion bus systems wherein a unique ID is transmitted over an ID line and wherein a repeater unit having the lowest ID value cannot detect collision conditions.

In one exemplary embodiment, the expansion bus of the invention is implemented using Ethernet bus protocols wherein data to be transmitted is preceded by a preamble. The repeater units discard the preamble received and generate and transmit a new preamble. The repeater units detect an incoming preamble well in advance of receipt of actual data to be transmitted. The aforementioned arbitration steps, wherein an activity signal is asserted then all other activity lines are monitored during a delay period, are performed prior to actual receipt of data for transmission. Accordingly, the arbitration steps do not cause any delay of the transmission of the data signals.

Thus, an arbitration unit is provided within each repeater unit which detects global collisions between data signals received through local transceivers connected to separate repeater units. Each repeater unit also includes separate collision detection circuitry for detecting local collisions between data signals received from two or more local transceivers connected to a single repeater unit. The separate local collision detection circuitry may be entirely conventional. The repeater unit detecting the local collision signals the other repeater units that a local collision has been detected by transmitting an appropriate signal over a dedicated collision line. Depending upon the implementation, it may be also desirable to transmit a signal indicating a global collision over the collision line. Such is not necessary because each of the arbitration units of the various repeater units are symmetric and thereby can each detect global conditions directly. Nevertheless, such may be described to provide redundancy in global collision detection.

Hence, a expansion bus is provided which allows global collisions to be detected without requiring a separate central arbitration unit and without requiring handling of any special cases, i.e., the expansion bus of the invention is entirely symmetric. Accordingly, the general objective of the invention set forth above is achieved. Other advantages, features and objects of the invention will be apparent for the detailed description and from the drawings attached hereto. As noted, the invention is advantageously exploited within a bus system configured in accordance with Ethernet bus protocol. However, the invention may be exploited in other bus systems as well.

DETAILED DESCRIPTION OF THE INVENTION OF EXEMPLARY EMBODIMENTS

Referring to the figures, exemplary embodiments of the invention will now be described. The exemplary embodiments are primarily described with reference to block diagrams illustrating primary components of the expansion bus of the invention. In most cases, the detailed configuration of components illustrated in the block diagrams will not be set forth as these components are either entirely conventional or are based on conventional components which can be easily modified, in accordance with the teachings provided herein, by those of ordinary skill in the art. Also, it should be understood that some components of practical systems incorporating the invention, which are not necessary for an understanding of the invention, are not illustrated and will not be described. Also, herein, the apparatus element corresponding to each individual block may referred to as a means for, an element for or a unit for performing the functions described in connection with the block.

Initially, an overview of the operation of the invention will be described with reference to FIGS. 1–3. Then, detailed exemplary embodiments of the invention will be described with reference to the remaining figures.

Figure 1:
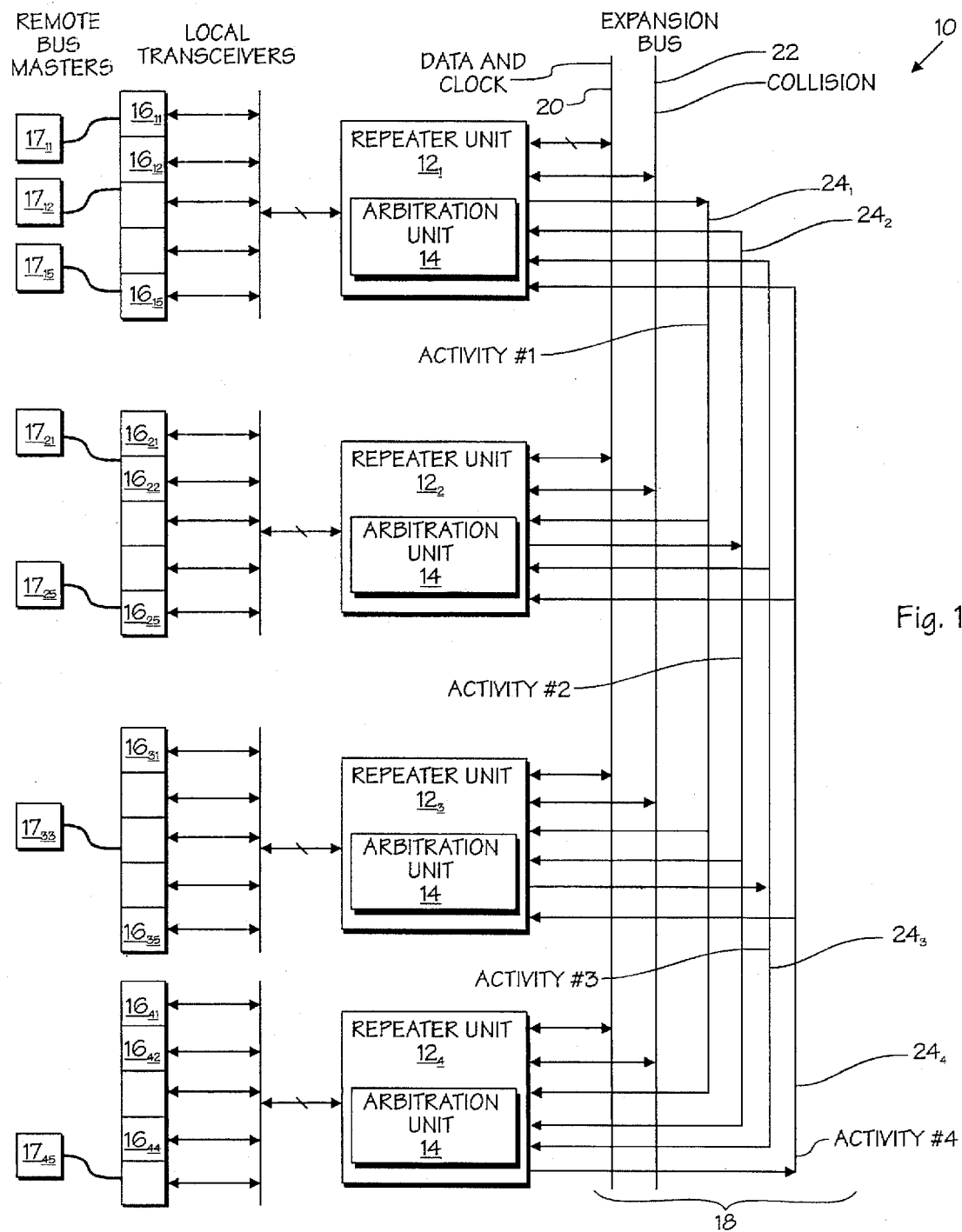
FIG. 1 is a block diagram of an expansion bus configured in accordance with the invention wherein each of a plurality of repeater units has a symmetric arbitration unit.

FIG. 1 illustrates a bus expansion system 10 having a set of four repeater units 12 each having an arbitration unit 14. Each repeater unit 12 is connected to a set of local transceivers 16 of which five are illustrated. The local transceivers 16 are connected to respective external bus masters 17 over one of the variety of transmission media. A few exemplary bus master are illustrated. In one implementation, transceivers are each CY971 transceiver chips provided by Cypress Semiconductor, the assignee of rights to the present application.

The repeater units are interconnected by a bus line 18 having data and clock line 20, a single collision line 22 and a set of activity lines 24 with one activity line for each repeater unit. (The width of data line 20 is a function of the attached transceivers.) In general, an expansion bus may be configured with an arbitrary number of repeater units each having an arbitrary number of local transceivers connected thereto.

Collectively, the expansion bus components operate to transmit data signals received from one of the local transceivers to all of the other transceivers which are connected to all other repeater units. The expansion bus is configured in accordance with an Ethernet, or similar, bus protocol, wherein only one data packet or signal may be transmitted from one transceiver to the other transceivers at any one time. If two or more data signals are provided for transmission at the same time, i.e., two data transmissions overlap either completely or partially, then a collision occurs and both data signals must be invalidated and retransmitted. If the two data signals are both received from local transceivers connected to a single repeater unit, then the collision is said to be a "local" collision. If the two data signals are received from local transceivers connected to different repeater units, then the collision is said to be a "global" collision.

A global collision is detected separately by all of the arbitration units 14 which will be described in greater detail below. A local collision is detected by circuitry (not separately shown) which may be entirely conventional. When a global collision is detected, each of the repeater units transmit appropriate jam signals through the local transceivers to the remote bus masters identifying the collision and requesting retransmission of data, if necessary. The manner by which the jam signals are generated and transmitted may be entirely conventional and will not be further described. When a local collision is detected, a collision signal is asserted onto collision line 22 by the repeater unit detecting the collision to notifying all other repeater units of the local collision. Again, all repeater units transmit appropriate jam signals through the local transceivers to remote bus masters identifying the collision and requesting retransmission of data, if necessary.

Briefly, global collision detection is achieved as follows. Initially, when a repeater unit receives data for transmission through one of the local transceivers connected thereto, the repeater unit asserts an activity signal along its corresponding activity line, i.e., repeater unit $12_1$ asserts a signal along activity line $24_1$. The repeater unit then waits a predetermined period of time before actually transmitting any data. During that time period, the repeater unit monitors all other activity lines to determine if any activity signals are asserted. If no such activity signals are asserted during the time period, then the repeater unit begins transmission of a received data signal over data line 20. If one or more activity signals are detected on the other activity lines during the time period, then the repeater unit does not begin transmission of data. Rather, the repeater unit detecting that collision transmits the appropriate jam signals to the external bus masters connected thereto through the corresponding local transceivers. All other repeater units also detect the same collision and also transmit appropriate jam signals to the respective external bus masters connected thereto.

Assuming that no initial collision is detected, the repeater unit receiving the data signal transmits the data signal along data line 20 while simultaneously monitoring collision line 22 and the activity lines $24_{2-4}$. If, during the transmission of the data, a local collision signal is asserted by one of the other repeater units along collision line 22 or another activity line is asserted (thereby indicating a global collision), then the repeater unit transmitting the data terminates transmission of the data and transmits the appropriate jam signals to the remote bus masters through the corresponding local transceivers. All other repeaters transmit jam signal to their bus masters as well.

In this manner, global collision detection and arbitration is achieved using symmetric distributed arbitration units without requiring a separate central arbitration unit.

The process outlined above will now be described in greater detail with reference to FIG. 2 which relates to the transmission of data signals configured in accordance with Ethernet protocols where each data signal may be preceded by a preamble. Initially, at step 100, the arbitration unit detects any activity provided by a remote source through one of the local transceivers. The activity may be a preamble signal, a jam signal or a data signal. (In accordance with ethernet protocol, the repeater must retransmit data signals, even in the absence of a preamble. In such case, the data is invalid, but still must be retransmitted.) At step 102, the arbitration unit asserts an activity signal on the corresponding dedicated activity line. The arbitration unit then waits the predetermined delay period while simultaneously monitoring all other activity lines, 104. If, at step 106, activity is detected on any of the other activity lines during the delay time, then execution proceeds to step 110 where the repeater unit invalidates data previously transmitted by sending appropriate jam signals to every remote bus master connected thereto. If at anytime the arbitration unit detects activity on two or more activity lines execution proceeds to step 110 as shown by arrows from blocks 100, 102 and 104. All repeater arbitration units behave symmetrically and, therefore, all repeater units invalidate data previously transmitted by sending appropriate jam signals as well. After step 110, execution returns to step 100 wherein the arbitration unit again monitors the local transceivers to detect the any activity for transmission.

If, at step 106, no activity is detected during the time delay period, then execution proceeds to step 112 where the repeater unit starts to generate and transmit a new preamble to the bus masters. The generation and transmission of a new preamble is performed in accordance with conventional Ethernet protocols and will not be described further. Then, at 114, the repeater unit begins transmitting data (received following the originally detected preamble) over the expansion bus. The data is transmitted between repeaters on the shared single data bus. All repeaters receive the data and retransmit it to the bus masters. Execution of step 114 may begin prior to completion of step 112. During transmission, the repeater unit continues to monitor the collision line and all activity lines, step 116, to detect a global collision or any local collision signals generated by any of the other repeater units. If, at step 118, a collision signal or other activity is detected, then execution again proceeds at step 110 wherein the data being transmitted is invalidated and appropriate jam signals are transmitted to remote sources. If no collision signal or other activity is detected, then the repeater unit continues to transmit data, step 120. Execution of step 116–120 continues within a loop until either a collision signal or other activity is detected or until all data has been transmitted. If all data has been transmitted without the detection of a collision signal or other activity, execution returns to step 100 for eventual detection and transmission of additional data.

Thus, the transmission of data is delayed by a predetermined delay time to allow the arbitration unit of the repeater unit receiving the data transmission time to determine whether any of the other repeater units are simultaneously transmitting data or preparing to transmit data. The delay time is set to the maximum time required for an activity signal to be transmitted to, and processed by, each of the other repeater units of the expansion bus system. For a 25 MHz bus system, the delay time may be set to, for example, about 40 nanoseconds. The actual optimal delay depends, of course, on the specific characteristics of the expansion bus system and can be determined from an analysis of the system including its physical and electrical characteristics.

Preferably, the delay time is less than an amount of "preamble" time between detection of the preamble and reception of actual data to be transmitted. If so, then the bus arbitration is performed before any data is actually received for transmission. As such, received data from transceivers need not be delayed pending completion of arbitration steps. Within Ethernet, or similar, systems the preamble time is fairly long compared to practical delay times thereby ensuring that the data itself need not be further delayed. In other systems, however, practical delay times may be greater than the preamble time. If this happens, the start of preamble must be delayed in accordance with the data delay (or else the preamble will finish and there will be no data).

Figure 2:
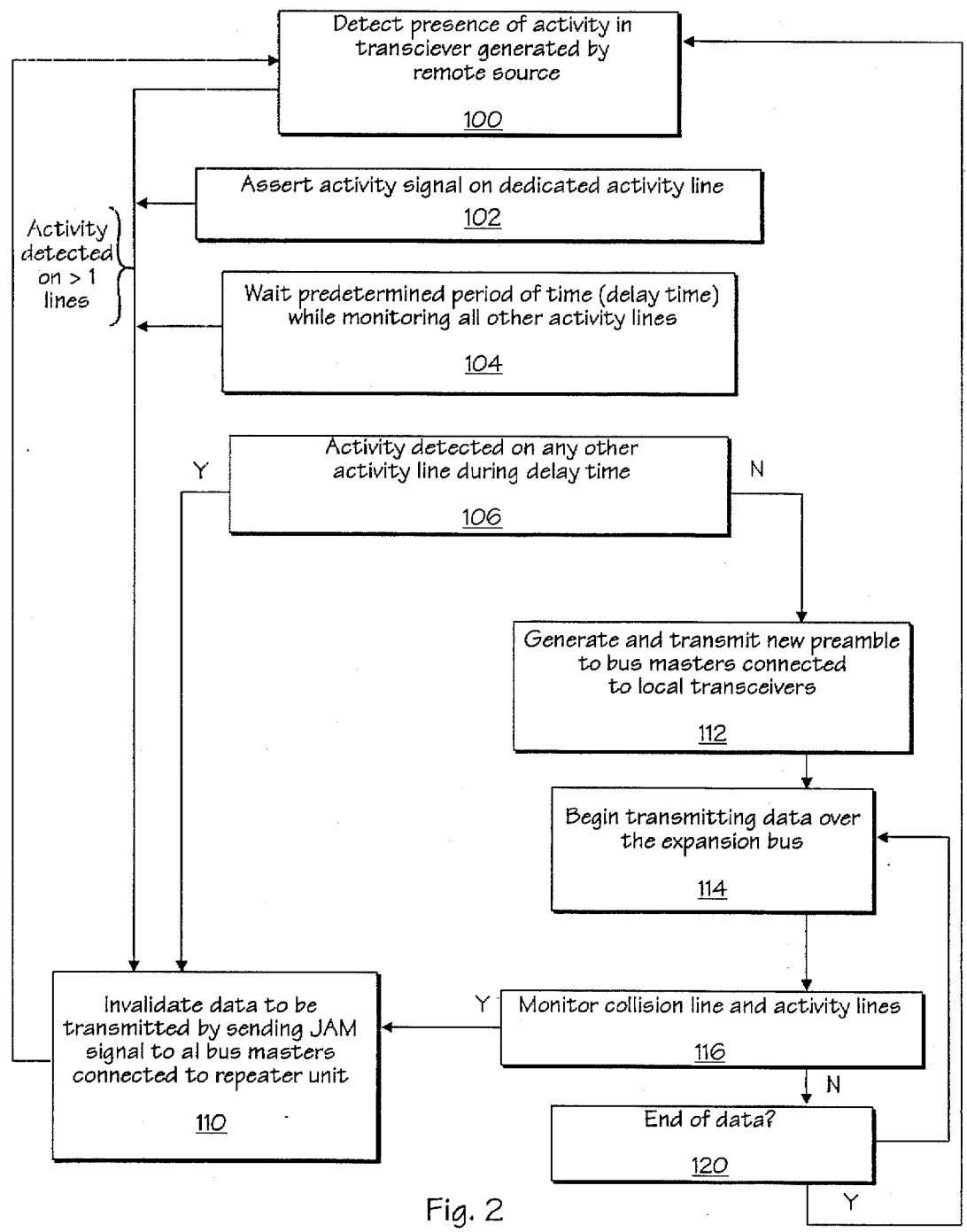
FIG. 2 is a flow chart illustrating a method performed by the arbitration units of the expansion bus of FIG. 1.
Figure 3:
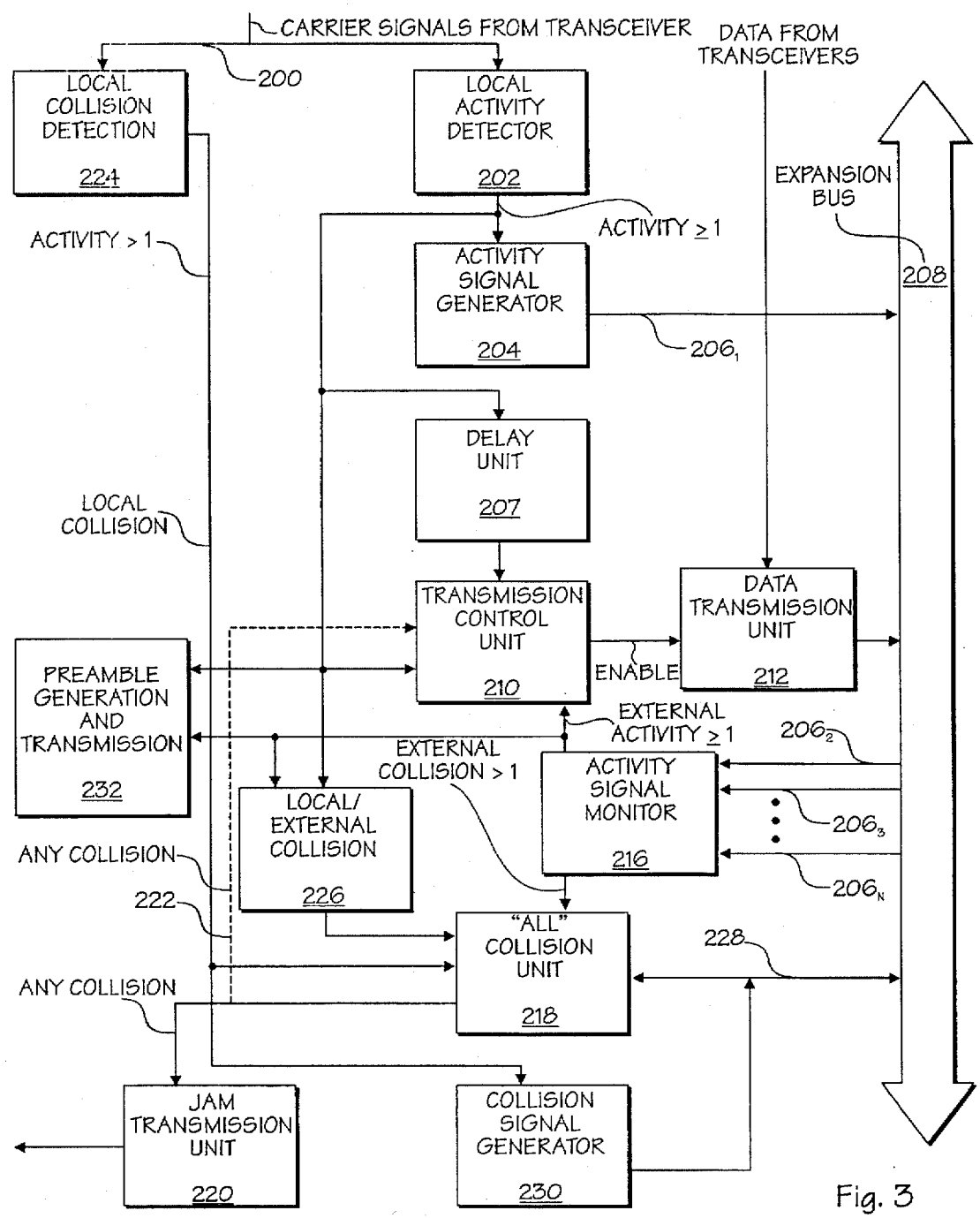
FIG. 3 is a block diagram of an exemplary implementation of one of the arbitration units of the expansion bus of FIG. 1.

FIG. 3 illustrates an exemplary arbitration unit having components for performing the various method steps of FIG. 2. Carrier signals are received from the transceivers connected to the repeater unit of the exemplary arbitration unit along bus 200 having width M where M is the number of local transceivers. A local activity detection unit 202 outputs an activity signal if one or more of the carrier signals indicates activity. The internal activity signal generated by unit 202 triggers an activity signal generator unit 204 and a delay unit 207. Activity signal generator unit 204 transmits an activity signal on an activity line $206_1$ which forms a part of expansion bus 208.

After a delay time controlled by delay unit 207, a transmission control unit 210 transmits an enable signal to a data transmission unit 212 which, in turn, begins transmitting data received along a line 214 from a local transceiver onto expansion bus 208 via line 214. However, the transmission control unit only generates an enable signal if no activity signals are detected during the delay period by an activity signal monitor 216 connected to each of the other activity lines $206_2$–$206_N$ where N is the number of repeater units. Moreover, even if data transmission is initially enabled after completion of the delay period, the transmission control unit will disable data transmission if the activity signal monitor detects any activity on any of the other lines during transmission. In other words, activity signal detection is performed at all times, including during the initial delay period and during actual transmission of data.

The external activity signal transmitted from the activity signal monitor to the transmission control unit is asserted whenever one or more of the other activity lines carry an activity signal. The activity signal monitor also asserts an external collision signal to an "all" collision unit 218 if more than one of the other activity lines carries an activity signal. The all-collision unit examines all possible sources of collisions and generates a single internal collision indication signal that is used to initiate the transmission of jam signals by a jam transmission unit 220. The internal collision indication signal may also optionally be employed for disabling transmission of data onto the expansion bus as illustrated by internal connection line 222 (shown in phantom lines). As noted, the all-collision unit examines at all possible sources of collision. In general, four sources of collision signals are received: 1) local collision signals, 2) external collision signals, 3) local/external collision signals, and 4) collisions signals provided by other repeater units following detection of a local collision within the other repeater unit. Local collisions are collisions between signals provided by local transceivers. External collisions are collisions between two other repeaters. Local/external collisions are collisions between the local repeater unit and one or more other repeater units.

Hence, the all-collision unit receives, in addition to an external collision signal from the activity signal monitor, a local collision signal detected by a local collision detection unit 224, a local/external collision signal detected by a local/external collision unit 226, and a remote collision signal received from a collision line 228 forming part of extension bus 208. Local activity collision signals generated by local collision detection unit 224 are also transmitted to a collision signal generation unit 230 which asserts a collision signal onto line 228 for transmission to the other repeater units of the bus system.

Finally with regard to the system of FIG. 3, a preamble generation and transmission unit 232 generates a preamble locally in response to the detection of activity by local activity detection unit 202 and external activity from 216. The locally generated (or regenerated) preamble is transmitted to each bus master connected to the local transceivers. Data subsequently received along line 214 from other local transceivers or along bus 208 from remote repeater units is appended to the preamble for transmission to the bus masters of the local transceivers. Components provided for receiving data over expansion bus 208 and for retransmitting data received over the expansion bus or received along line 214 to the bus masters of the local transceivers are not illustrated and are not pertinent to the invention.

Thus, the apparatus elements of FIG. 3 operate to perform the methods steps outlined in FIG. 2. It should be understood, however, that the steps of FIG. 2 may be performed by systems other than that illustrated in FIG. 3. Likewise, the system of FIG. 3 may operate to perform method steps differing from those specifically set forth in FIG. 2.

Figure 4:
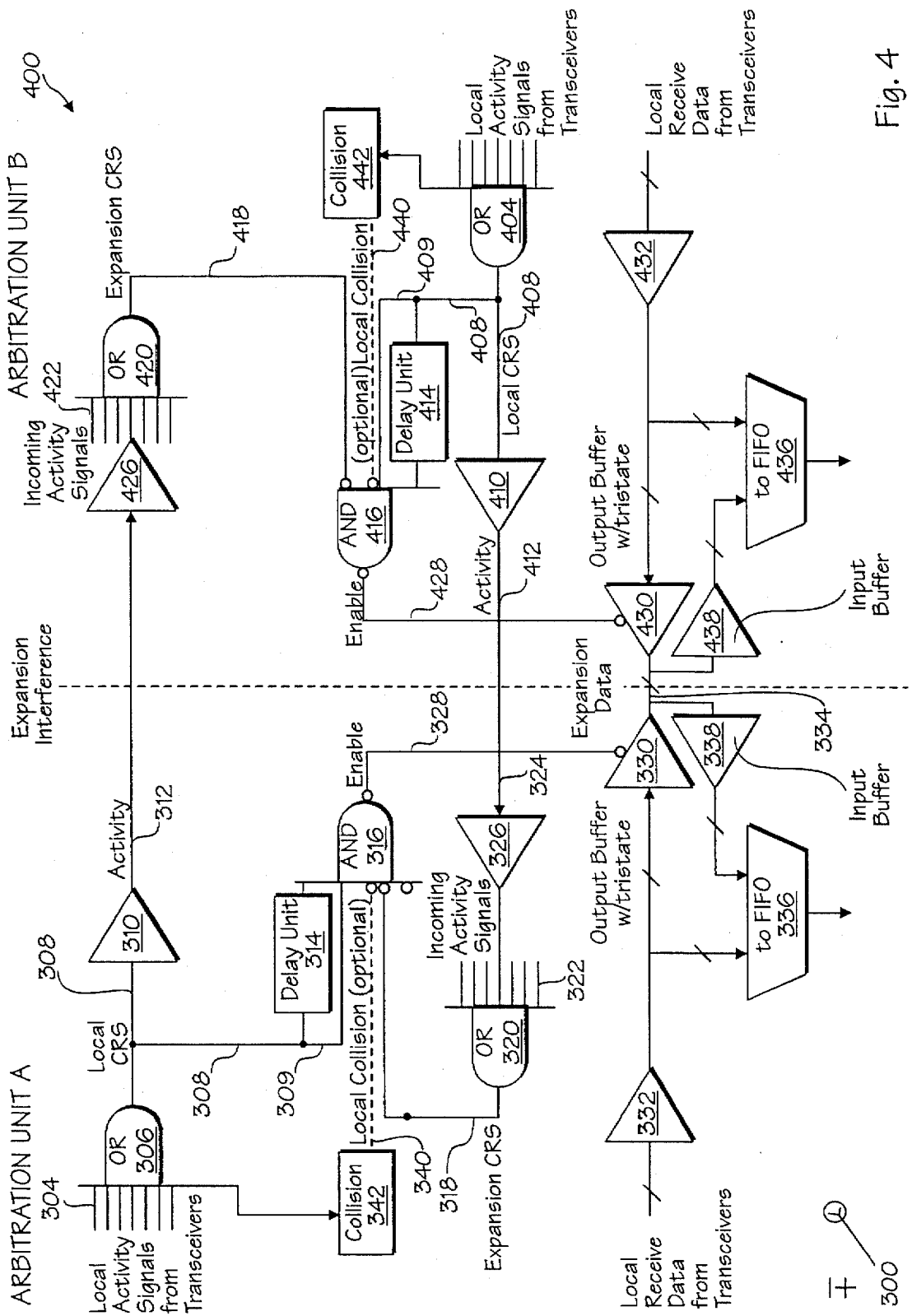
FIG. 4 is a schematic diagram illustrating a specific exemplary implementation of a pair of arbitration units of the expansion bus of FIG. 1.

With reference to the schematic diagrams and timing diagrams of FIGS. 4–6, a specific embodiments of the invention will now be described. First, with reference to FIG. 4, a portion of a pair of repeater units 300 and 400 are illustrated. The operation of repeater units 300 and 400 will be described primarily with reference to a data signal received through a local transceiver (not shown in FIG. 4) connected to repeater unit 300. Initially, an activity signal identifying the presence of activity on the local transceivers is received along one of the number of local activity lines 304 connected to the respective local transceivers and connected into an OR gate 306 which generates a local carrier sense (CRS) signal on line 308. The local CRS signal is output by an amplifier 310 as an activity signal on a dedicated activity line 312 of the repeater unit. Local CRS signal is transmitted through a branch line 309 of local CRS line 308 to a NAND gate 316. The local CRS signal is also transmitted through a delay unit 314 into NAND gate 316. NAND gate 316 also receives, through a inverted input, an expansion CRS signal along a line 318 through an OR gate 320 which receives incoming activity signals from each of the other repeater units along the respective dedicated activity lines 322. One such activity line 324, shown in FIG. 4, is connected to repeater unit 400 through an amplifier 326.

Thus, NAND gate 316 receives a delayed local CRS signal through delay unit 314, an inverted activity signal through line 318 and a non-delay local CRS signal along branch 309 of local CRS line 308. With this arrangement, NAND gate 316 only generates an enable signal if a local CRS signal is received along 309 and no expansion CRS signal is received along 318. Moreover, NAND gate 316 generates the enable signal, if at all, only after the delay period generated by delay unit 314. In other words, the NAND gate generates an enable signal only if no other activity is detected from any of the other repeater units during the predetermined delay period. Assuming that an enable signal is generated, the signal is output from NAND gate 316 along enable line 328 to an output tri-state buffer 330 which is connected through an amplifier 332 to the local transceiver (not shown,) providing the data signal. Once enabled, data provided by the local transceiver is driven onto an expansion bus 334 by tri-state buffer 330 for reception by the other repeater units of the system, such as repeater unit 302. Data provided by the local transceiver is also output through a multiplexer 336 to a FIFO (not shown). Multiplexer 336 also receives data signals from other repeater units via expansion bus 334. These input data signals are amplified by an input buffer 338. Thus, multiplexer 336 either routes data received from the local transceiver to the FIFO or routes data received from one of the other repeater units to the FIFO. A control signal (not shown) controls operation of multiplexer 336.

Finally, with regard to repeater unit 300, a local collision line 340 (shown in phantom lines) may also be connected into NAND gate 316. Local collision line 340 is connected through a local collision detection unit 342 which receives signals from a local activity signal lines 304. With this alternative arrangement, NAND gate 316 is prevented from generating an enable signal if a local collision is detected. Hence, the enable signal is only generated, after an appropriate delay period, if there is no local collision and no global collision.

Repeater unit 400 has an arrangement symmetric with that of repeater unit 300 and like elements are numbered with like reference numerals, but incremented by 100. Repeater unit 400 operates in the same manner as repeater unit 300 and will not be described in further detail.

Now considering the requisite amount of delay provided by delay unit 314. The amount of delay must be greater than or equal to the amount of time necessary for the activity signal output along line 312 to propagate to repeater unit 400 and into NAND gate 416 thereby preventing the generation of an enable signal by NAND gate 416. This delay time may be expressed as follows:

Delay to turn on Output Buffer A due to local activity on A:

$$t_{Local\_CRS_A} + t_{Delay_A} + t_{Enable_A} = T_{on_A}$$

Where $t_{Local\_CRS_A}$ is equal to the delay time from start of signal reception in a transceiver connected to A, through OR gate 306 to delay unit 314, $t_{Delay_A}$ is equal to the delay through delay unit 314, and $t_{Enable_A}$ is equal to the delay through NAND gate 316 and along line 328.

Delay to turn off Output Buffer B due to local activity on A $$t_{Local\_CRS_A} + t_{Expansion\_Interface} + t_{Expansion\_CRS_B} + t_{Enable_B} = T_{off_B}$$

Where $t_{Expansion\_Interface}$ is the delay through amplifier 310, activity line 312 and input amplifier 426, $t_{Expansion\_CRS_B}$ is the delay through input OR gate 420 and expansion CRS line 418 and when $t_{Enable_B}$ is the delay through NAND gate 416 and enable line 428.

In order to avoid bus contention on the expansion data bus, the following must be true:

$$T_{on_A} > T_{off_B}$$

Assuming $t_{Enable_A} \approx t_{Enable_B}$, then:

$$t_{Delay_A} > t_{Expansion\_Interface} + t_{Expansion\_CRS_B}$$

This is a general statement. There may be more than two arbitration unit. The delay element in any arbitration unit ($t_{Delay}$) must be greater than worst case expansion interface delay of any activity signal and expansion activity detection.

Figure 5:
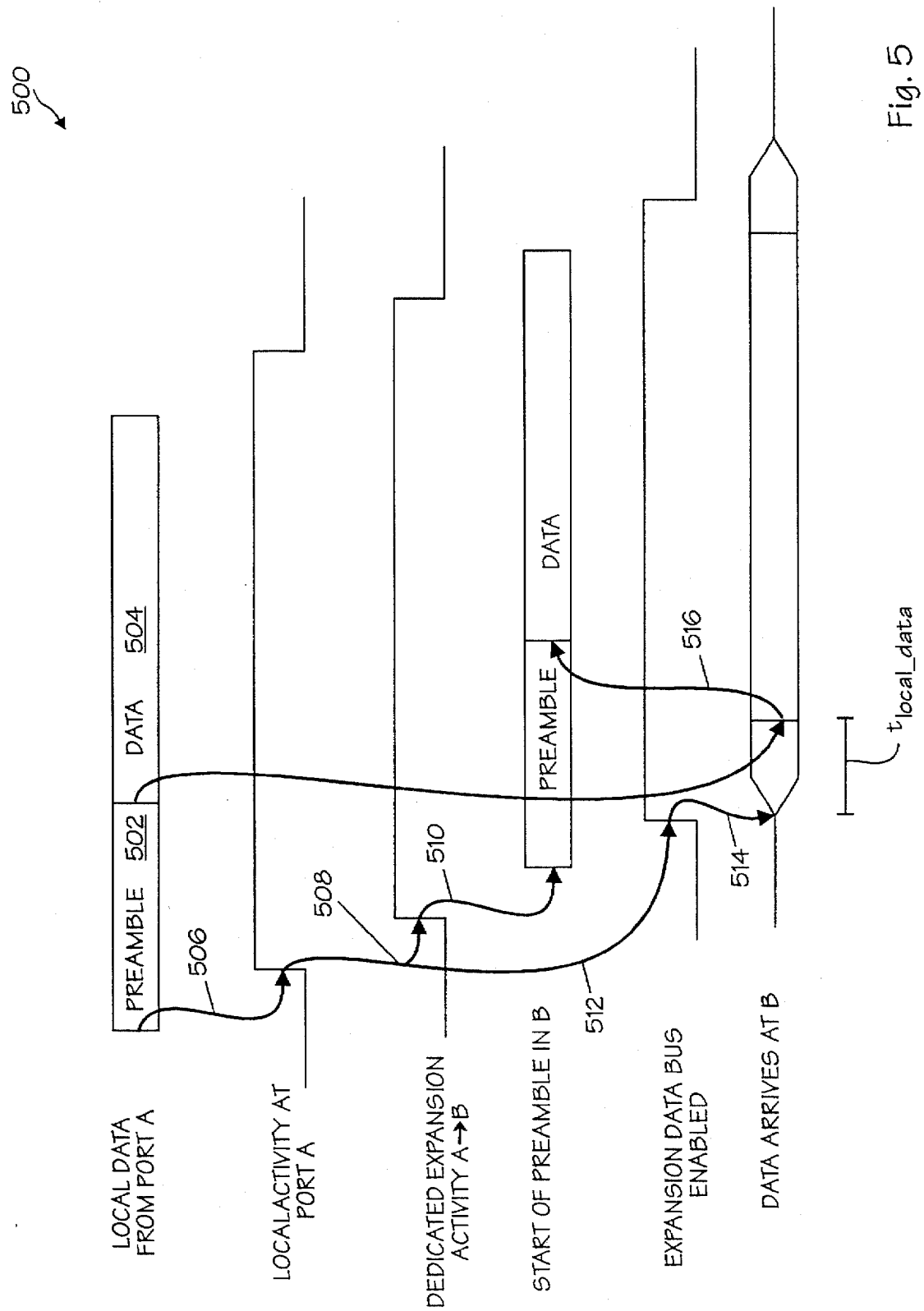
FIG. 5 is a timing diagram illustrating transmission of signals having preamble and data portions using the expansion bus of FIG. 1.

For an implementation wherein the input signals conform to Ethernet data protocols it is preferable that the aforementioned delay time is also shorter than the preamble time to thereby prevent any delay in transmission of data. FIG. 5 illustrates an exemplary Ethernet packet 500 having a preamble portion 502 and a data portion 504. FIG. 5 also includes various timing diagrams illustrating the various propagation delay time periods relative to the preamble delay. The delay time may be further represented, relative to the preamble time, as follows:

$$t_{start\ of\ packet_{A \to B}} = t_{Local\_CRS_A} + t_{Expansion\_Interface} + t_{Expansion\_CRS_B} + t_{preamble\_generation_B} t_{Expansion\ bus\ enable_B} + t_{on_A} + t_{Expansion\_Interface} + t_{FIFO\_setup} + t_{Local\_data_A}$$

Where $t_{Local\_CRS_A}$ represents the delay along line 506, $t_{Expansion\_Interface}$ and $t_{Expansion\_CRS_B}$ together represent the delay time along line 508, $t_{preamble\_Generation_B}$ represents the delay along line 510 (i.e., the time required to generate 64 bits of preamble and frame delimiter), $t_{on_A}$ represents the delay along line 512, $t_{Expansion\_Interface}$ represents the delay along line 514, $t_{FIFO\_setup_B}$ represents the delay along line 516 (i.e., set-up time to write data into the FIFO), $t_{Local\_Data_A}$ is the time delay for any signal to pass through the transceiver connected to A data path (as shown in FIG. 5), and $t_{start\ of\ packet_{A \to B}}$ is the time delay between when a transceiver connected to A receives a packet and the preamble of that packet has been generated by repeater B. This is when data is needed at B.

Since, the time when data is needed at core B > Time when data arrives at core B, then $$t_{start\ of\ packet_{A \to B}} < t_{preamble} + t_{expansion\_CRS_B} + t_{preamble\_generation_B} - t_{Enable_A} - t_{FIFO\_setup_B} - t_{Local-data_A}$$

The equation above sets the upper limit on $t_{Delay}$ that can be tolerated in an Ethernet repeater without losing data. In a typical Ethernet repeater application, the preamble time ($t_{preamble}$) is much larger than the other delay parameters. Hence, $$Delay\_on > t_{Preamble} + t_{Expansion\_CRS} + t_{Preamble\_Generation} - t_{Enable} - (t_{FIFO\_setup} + t_{Local\_Data}).$$

Example:
each unit=1 bit time (BT)

$$t_{Delay\_on} < 64 + 4 + 4 - 2 - 12 = 58\ BT$$

Typical delays required are on the order of 4–6 BT. Accordingly, there is plenty of margin for most applications.

SPECIFIC EXAMPLE OF REPEATER UNIT

Figure 6:
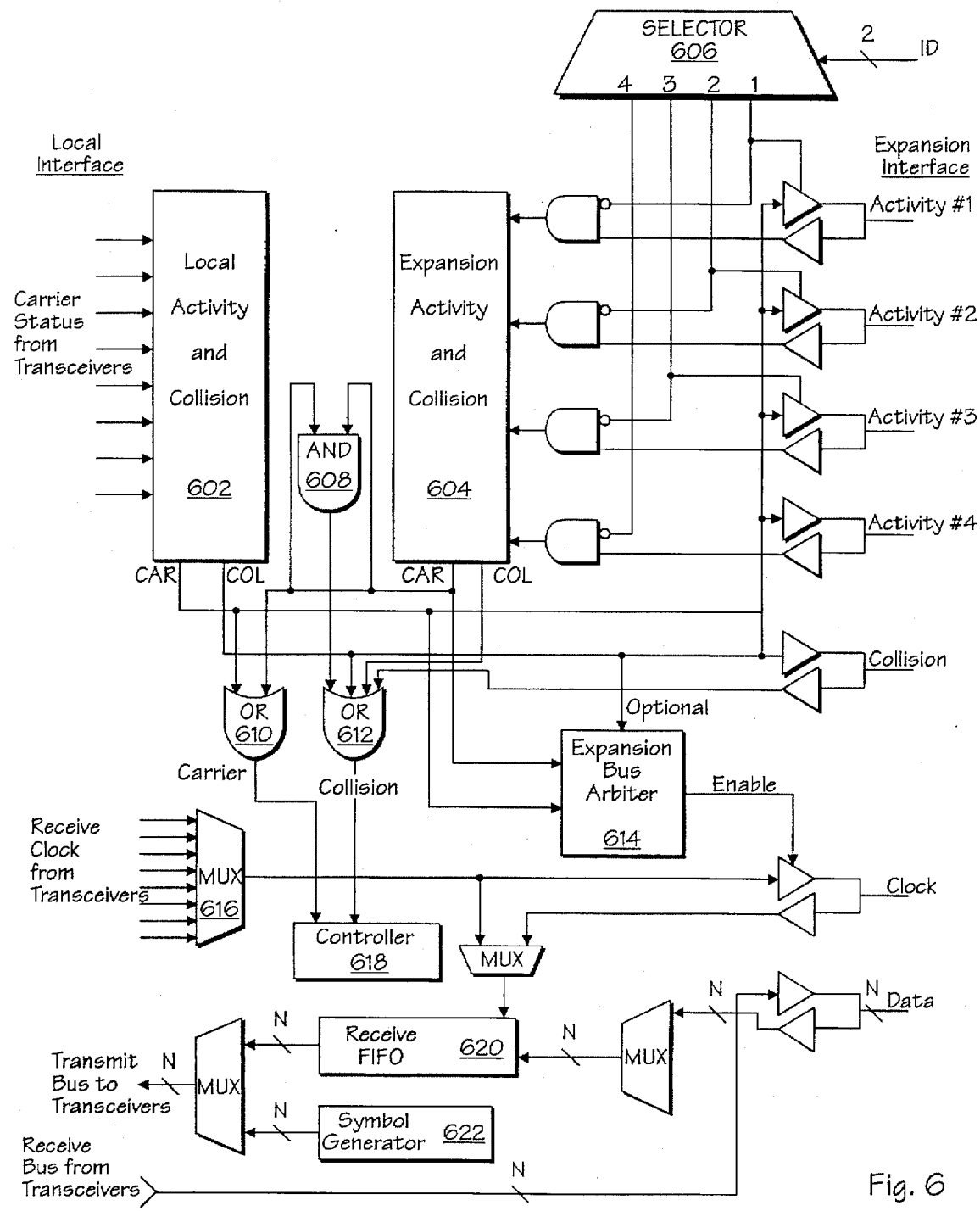
FIG. 6 is a block diagram, partially in schematic form, of a specific exemplary implementation of one of the repeater units of the expansion bus of FIG. 1.

FIG. 6 illustrates an exemplary repeater unit 600 in detail. The repeater unit of FIG. 6 may incorporate arbitration components of the type illustrated in FIG. 4 or other suitable arbitration components. For simplicity, FIG. 6 merely illustrates an expansion bus arbitration unit in block diagram form. The various components of the repeater unit of FIG. 6 operate as follows:

A local activity and collision unit 602 monitors all of the carrier sense signals from the local transceivers. There may be an arbitrary number of transceivers. When one or more carrier sense signals become active, a CAR signal is asserted HIGH. If more than one carrier signal is true simultaneously, a COL signal is asserted true. This indicates a collision. The activity block can be used to select a local transceiver as the active port.

An expansion activity and collision unit 604 monitors the inputs from the expansion interface. When an activity signal is true, expansion CAR is asserted true. There may be an arbitrary number of expansion activity inputs. This example shows four. If more than one expansion activity signal is true at a given time, a collision is indicated on the expansion COL signal.

An ID selector unit 606 is used to assign an ID number to the core. The ID number determines which expansion activity signal the core will use on the expansion bus. The selector ID number is determined from external signals. There must be a unique ID number assigned to each core that comprises a repeater. In this example, two selector inputs are used to assign one of four (1, 2, 3 or 4) ID numbers to the core. Note that in this implementation, the ID number will cause the selector to assert the appropriate selector signal true. This will cause the output buffer on the appropriate activity signal to be enabled. The other output buffers remain disabled. Conversely, the input into the expansion activity and collision block becomes inactive for the assigned activity signal and active for the others.

An AND gate 608 uses the Local CAR and Expansion CAR to determine if there is a collision between a local transceiver and one elsewhere in the system.

A carrier OR gate 610 combines the Local CAR and Expansion CAR into a single carrier signal that is used by the controller to initiate preamble generation and stop packet transmission.

A collision OR gate 612 examines at all of the possible collision indications (local only, global external only, global local-external, remote-local) and combines them into a single collision indication. The collision signal is used to put the repeater controller and port signals in their jam states.

An expansion bus arbiter 614 controls access to the expansion bus. It prevents bus contention. As noted, the scheme is symmetric and uses a time delay mechanism that does not impact system performance. The carrier signals from local and expansion blocks are inputs. The arbitration unit outputs an enable signal that controls the local expansion bus buffers.

A clock mux 616 is a simple N:1 mux that multiplexes N clock inputs into a single clock output. The clock output is used to clock the write port on the FIFO. The clock inputs come from the receive port on the local transceivers. Clock selection is made dependent on the active port.

A controller 618 monitors the carrier and collision signals and generates the appropriate signals that control that data that is retransmitted. The controller controls the data mux, FIFO read port and transceiver interface signals.

A receive FIFO 620 is used to buffer and retime data between the receive and transmit ports. The FIFO in this example is 8 words deep.

A symbol generator 622 generates special symbol code groups that are required to regenerate an ethernet packet. Code groups may include: idle, preamble, jam, etc.

What has been described is an expansion bus having a distributed symmetric global collision detection and arbitration system. The expansion bus of the invention is particularly advantageously employed in connection with bus systems configured in accordance with Ethernet protocol. However, principles of the invention are applicable to a wide range of other bus systems and in other systems as well, both to solve problems of the type described above and to solve other problems not specifically mentioned herein. The exemplary embodiments provided herein are merely illustrative of the invention and should not be construed as limiting the scope of the invention.

What is claimed is:

1. A repeater unit, comprising:
   an interface unit configured to communicate with one or more associated bus masters; and
   an arbitration unit coupled to the interface unit and configured to interface with an expansion bus having a data bus, a separate collision line and a plurality of separate activity lines, wherein said arbitration unit comprises:
   an activity detector configured to receive an indication of data to be transmitted on said data bus and to transmit an activity signal on one of said activity lines to indicate an upcoming transmission of said data on said data bus;
   a delay unit coupled to said activity detector and configured to delay said transmission of said data on said data bus for a predetermined period of time;
   an activity signal monitor configured to monitor said activity lines for another activity signal; and
   a transmission unit coupled to said delay unit and to said activity monitor and configured to transmit said data on said data bus after said predetermined period of time if no other activity signals are detected by said activity monitor.

2. A repeater unit as in claim 1 wherein said activity detector is further configured to transmit the activity signal on one of said activity lines prior to said repeater unit transmitting data on said data bus, and wherein said activity signal monitor is configured to to generate an external collision signal in the event at least one other activity signal is detected at a time when said repeater unit is transmitting data onto said data bus.

3. A repeater unit as in claim 2 whereto said arbitration unit further comprises means for generating a collision signal to be transmitted on said collision line in the event two or more of said associated bus masters attempt to access said data bus.

4. A repeater unit as in claim 3 wherein said arbitration unit further comprises means for detecting a collision signal transmitted by another unit on said expansion bus.

5. A repeater unit as in claim 3 further comprising a jam signal transmission unit coupled to said generating means and configured to generate a jam signal for transmission to one or more of said associated bus masters in the event said arbitration unit detects a collision signal or an activity signal.

6. A method of arbitration for control of a shared bus having a separate data bus, collision line and a plurality of access lines, comprising the steps of:

detecting data to be transmitted over said data bus;

transmitting an activity signal on one of said activity lines prior to transmitting said data on said data bus;

monitoring one or more of the remaining activity lines for a period of time at least equal to a maximum amount of time necessary to receive one of the other activity signals, and monitoring the collision line for a collision signal;

enabling transmission of said data onto said data bus if no other activity signal and no collision signal are detected, otherwise not enabling transmission of said data; and continuing to monitor said other activity lines and said collision line during transmission of said data if such transmission was enabled, wherein if during such transmission another activity signal or said collision signal is detected, terminating said transmission.

7. A method as in claim 6 wherein said steps of transmitting an activity signal, monitoring one or more remaining activity lines and enabling transmission of said data are repeated after a random period of time following a terminated transmission due to a detection of one or more activity signals or said collision signal.

8. A method of transmitting data on a shared bus, comprising the steps of:

receiving an indication of data to be transmitted on said shared bus, wherein said indication of time comprises a preamble;

asserting an activity signal to indicate an upcoming transmission of said data on said shared bus;

delaying said transmission of said data on said shared bus for a predetermined period of time while monitoring for other activity signals, wherein said predetermined period of time is less than a time required to receive said preamble; and transmitting said data on said shared bus if no other activity signals are detected while performing said monitoring.

9. A method as in claim 8 wherein said step of transmitting said data on said shared bus further comprises regenerating said preamble prior to transmitting said data.

10. A method as in claim 8 wherein said predetermined period of time comprises a time required for units coupled to said shared bus to receive and process said activity signal.

11. A method as in claim 8 wherein said steps of receiving, asserting, delaying and transmitting are performed at a repeater unit coupled to said shared bus.

12. A method as in claim 11 wherein said shared bus is otherwise configured in accordance with an Ethernet bus protocol.

* * * * *